US009293749B2

(12) United States Patent
Seo et al.

(10) Patent No.: US 9,293,749 B2
(45) Date of Patent: Mar. 22, 2016

(54) HEAT-RESISTANT AND HIGH-TENACITY ULTRAFINE FIBROUS SEPARATION LAYER, METHOD FOR MANUFACTURING SAME, AND SECONDARY CELL USING SAME

(75) Inventors: In Yong Seo, Seoul (KR); Byung Gwang Jo, Gimpo-si (KR); Yong Sik Jung, Seoul (KR); Yun Hye Kim, Gwangyang-si (KR)

(73) Assignee: AMOGREENTECH CO., LTD. (KR)

( * ) Notice: Subject to any disclaimer, the term of this patent is extended or adjusted under 35 U.S.C. 154(b) by 987 days.

(21) Appl. No.: 13/505,633

(22) PCT Filed: Nov. 3, 2010

(86) PCT No.: PCT/KR2010/007706
§ 371 (c)(1),
(2), (4) Date: May 15, 2012

(87) PCT Pub. No.: WO2011/055967
PCT Pub. Date: May 12, 2011

(65) Prior Publication Data
US 2012/0225358 A1    Sep. 6, 2012

(30) Foreign Application Priority Data
Nov. 3, 2009   (KR) .................. 10-2009-0105679

(51) Int. Cl.
*H01M 2/16* (2006.01)
*H01G 9/02* (2006.01)
(Continued)

(52) U.S. Cl.
CPC ............... *H01M 2/162* (2013.01); *H01G 9/02* (2013.01); *H01M 2/145* (2013.01); *H01M 2/185* (2013.01); *H01M 2/1646* (2013.01);
(Continued)

(58) Field of Classification Search
None
See application file for complete search history.

(56) References Cited

U.S. PATENT DOCUMENTS

| 2009/0226807 A1 | 9/2009 | Nakamura |
| 2010/0233523 A1* | 9/2010 | Jo ........................ B32B 5/26 429/144 |

FOREIGN PATENT DOCUMENTS

| JP | 2001-222988 | 8/2001 |
| JP | 2005-209570 | 8/2005 |

(Continued)

OTHER PUBLICATIONS

International Search Report—PCT/KR2010/007706 dated Jun. 20, 2011.

*Primary Examiner* — Alix Eggerding
(74) *Attorney, Agent, or Firm* — Cantor Colburn LLP

(57) ABSTRACT

Provided is an ultrafine fibrous porous separator with heat resistance and high-strength and a manufacturing method thereof, which enables mass-production of a heat-resistant and high-strength ultrafine fibrous separator by using an air-electrospinning (AES) method, and to a secondary battery using the same. The method of manufacturing a heat-resistant and high-strength ultrafine fibrous porous separator includes the steps of: air-electrospinning a mixed solution of 50 to 70 wt % of a heat-resistant, polymer material and 30 to 50 wt % of a swelling polymer material, to thereby form a porous web of a heat-resistant ultrafine fiber in which the heat-resistant polymer material and the swelling polymer material are consolidated in an ultrafine fibrous form; performing drying to control a solvent and moisture that remain on the surface of the porous web; and performing thermal compression on the dried porous web at a temperature of between 170° C. and 210° C. so as to obtain the separator.

17 Claims, 6 Drawing Sheets

(51) Int. Cl.
*H01M 2/14* (2006.01)
*H01M 2/18* (2006.01)
*H01M 10/0525* (2010.01)

(52) U.S. Cl.
CPC ......... *H01M 10/0525* (2013.01); *Y02E 60/122* (2013.01); *Y02P 70/54* (2015.11); *Y10T 442/696* (2015.04)

(56) References Cited

FOREIGN PATENT DOCUMENTS

| | | | |
|---|---|---|---|
| JP | 2006-059717 | | 3/2006 |
| JP | 2009-199798 | | 9/2009 |
| WO | 01/89022 | | 11/2001 |
| WO | WO 2008/018656 | * | 2/2008 |

* cited by examiner

HEAT-RESISTANT AND HIGH-TENACITY ULTRAFINE FIBROUS SEPARATION LAYER, METHOD FOR MANUFACTURING SAME, AND SECONDARY CELL USING SAME

TECHNICAL FIELD

The present invention relates to an ultrafine fibrous porous separator with heat-resistance and high-strength, and more particular to a heat-resistance and high-strength ultrafine fibrous porous separator and a manufacturing method thereof in which the heat-resistant and high-strength ultrafine fibrous porous separators can be mass-produced using an air-electrospinning (AES) method, and a secondary battery using the same.

BACKGROUND ART

Consumers are demanding digitization of electronic products and high-performance thereof. Accordingly, the market of electronic products is also demanding to develop thin and lightweight electronic products and high-capacity batteries of high energy density. In addition, in order to cope with future energy and environmental issues, hybrid electric vehicles, electric vehicles, and fuel cell vehicles are being actively developed. As a result, car batteries are required to become larger in capacity.

Secondary batteries including lithium-ion secondary batteries, lithium-ion polymer batteries, and super-capacitors (electric double layer capacitors and the like) of high energy density and large capacity have a relatively high operating temperature range, respectively. In addition, when the second batteries continue to be used at a high-rate charge-discharge state, the temperature rises. Thus, separators that are usually used in these secondary batteries require higher heat-resistance and higher thermal stability than those required in ordinary separators. In addition, the secondary batteries should have excellent cell characteristics such as rapid charge and discharge and high ionic conductivity to respond to low temperature.

The separator is placed between the anode and the cathode of a battery cell to perform an isolation function. The separator maintains an electrolyte solution to thus provide an ionic conduction pathway. The separator has a shutdown function of blocking the pores by melting part of the separator to block electric current if the battery temperature rises up too much.

When the separator is melted as the temperature gets higher, a big hole is created to thus cause a short circuit occur between the anode and the cathode. The temperature is called a short-circuit temperature. Generally, the separator should have a lower shutdown temperature and a higher short-circuit temperature. In the case of a polyethylene separator, the separator is contracted at 150° C. or higher and thus the electrode portion is exposed, to finally cause a short circuit.

Therefore, it is very important for the secondary battery to have both a shutdown function and a neat-resistance performance in order to achieve a high-energy density and large-area secondary battery. In other words, it is required that the separator should have an excellent heat-resistance performance to thus cause small thermal shrinkage and an excellent cycling performance due to a high ionic conductivity.

It is very deficient to use an existing lithium-ion secondary battery using a polyolefin separator and a liquid electrolyte or an existing lithium-ion polymer battery using a polymer electrolyte that has been gel-coated, on a gel polymer electrolyte or a polyolefin separator for a high-energy density and large-capacity secondary battery in terms of the heat-resistance.

Therefore, the heat-resistance performance that is required for a high-capacity and large-area secondary battery for automobiles does not meet the safety requirements. In particular, the separator that is obtained by using polyethylene (PE) or polypropylene (PP) is melted at 150° C. or so, to thereby cause poor heat-resistance.

In order to solve this problem, that is, in order to ensure adequate safety for the high-energy density and large-area secondary battery, Japanese laid-open patent publication No. 2005-209570 disclosed a heat-resistant resin bonded polyolefin separator in which a solution of a heat-resistant resin such as aromatic polyamide, polyimide, polyether sulfone, polyether ketone, and polyetherimide having a melting point of, 200° C. or higher is coated on both surfaces of the polyolefin separator and the heat-resistant resin coated polyolefin separator is dipped in a coagulant solution, washed and dried, to thus obtain the heat-resistant resin bonded polyolefin separator. In order to reduce degradation of ionic conductivity, a phase separation agent is contained in the heat-resistant resin solution for granting porosity, and the heat-resistant resin layer is also limited as 0.5-6.0 g/m$^2$.

However, dipping of the heat-resistant resin blocks the pores of the polyolefin separator to accordingly restrict movement of lithium ions. As a result, since the charge-discharge characteristics are degraded, the heat-resistant resin coated polyolefin separator has not met requirements of large-capacity batteries for automobiles, although it has secured the heat-resistance. In addition, although the pores of the polyolefin separator are not blocked due to dipping of the heat-resistant resin, the ionic conductivity for the large-capacity battery is limited since porosity of the widely used polyolefin separator is 40% or so and the pore size is also several tens nanometers (nm) in diameter.

Japanese laid-open patent publication Nos. 2001-222988 and 2006-59717 disclosed a method of manufacturing a heat-resistant electrolyte separator, in which woven or nonwoven fabrics, porous films, etc., of polyaramid and polyimide whose melting point is 150° C. or higher are impregnated with or coated with a polymer gel electrolyte such as polyethylene oxide, polypropylene oxide, polyether, or polyvinylidene, to thus manufacture the heat-resistant electrolyte separator. However, even in this case, the required heat-resistance may be fulfilled, but in terms of ionic conductivity, ionic mobility in a holder or a heat-resistant aromatic polymer layer is still limited similarly to the case of the separator or gel electrolyte of the conventional lithium-ion battery.

Meanwhile, PCT international patent publication No. WO2001/89022 relates to a lithium secondary battery including ultrafine fibrous porous separator and manufacturing method thereof, and disclosed a technology of manufacturing the lithium secondary battery by using a method including the steps of: melting one or more polymers by a porous polymer separator, or dissolving one or more polymers in an organic solvent, to thus obtain a melted polymer or polymer solution; inputting the melted polymer or polymer solution into a barrel of a charge induced electrospinning machine; and charge-induced-electrospinning the melted polymer or polymer solution through nozzles on a substrate, to thereby form the porous polymer separator.

If only a heat-resistant polymer such as cellulose acetate is electrospinned or a heat-resistant polymer mixed with polyvinylidene fluoride (PVdF) that is a swelling polymer is electrospinned, in order to obtain the porous polymer separator, evaporation of a solvent rapidly proceeds during formation of fibers due to nature of the heat-resistant polymer, to thus cause the fibers to be dried very quickly. Accordingly, it is possible to form fibers in a spin nozzle pack of 1 to 10 holes, but fibers are not collected while flying if a multi-hole spin nozzle pack of more than 10 holes for mass production. As a result, since the separators that are obtained by using the multi-hole spin nozzle pack become too bulky, it may be difficult to form the separators and may act as a cause of the trouble of the spin.

In addition, a porous polymer separator proposed in the PCT international patent publication No. WO2001/89022 is obtained by electrospinning a polymer solution that is formed by dissolving one or more polymers in an organic solvent to then be manufactured into 50 μm thick, and then inserting the porous polymer separator between the cathode and anode in order to manufacture a lithium secondary battery to thus achieve integration by lamination. However, the PCT international patent publication No. WO2001/89022 does not concretely teach a content ratio of a heat-resistant polymer and a swelling polymer.

In addition, the Korean laid-open patent publication No. 2008-13208 disclosed a heat-resistant ultrafine fibrous separator and a manufacturing method thereof, and a secondary battery using the same. Here, the heat-resistant ultrafine fibrous separator is manufactured by an electrospinning method, and is made of an ultrafine fiber of a heat-resistant polymer resin having the melting point of 180° C. or higher or having no melting point, or made of an ultrafine fiber of a polymer resin that can be swollen in an electrolyte together with the ultrafine fiber of the heat-resistant polymer resin.

The method of manufacturing the heat-resistant ultrafine fibrous separator includes the steps of: electrospinning a mixed solution that is obtained by mixing a heat-resistant polymer material having the melting point of 180° C. or higher or having no melting point, and a swelling polymer that is swollen in an electrolyte solution, to thus form an ultrafine fiber web consolidated in both a heat-resistant polymer fibrous form and a swelling polymer fibrous form; and performing thermal compression (that is, laminating) of the ultrafine fiber web in the temperature range of 110 to 140° C.

In addition, in the case of the above Korean laid-open patent publication No. 2008-13208, a fibrous content of the swelling polymer material is 95 wt % or less above zero with respect to a polymer composition of the separator, in the heat-resistant ultrafine fibrous separator.

DISCLOSURE

Technical Problem

However, when a mixed solution of a heat-resistant polymer material and a swelling polymer material is electrospinned as proposed in the above Korean laid-open patent publication No. 2008-13208, for example, in the case that polyvinylidene fluoride (PVdF) being a swelling polymer material is contained at a ratio of more than 50 wt %, a melting phenomenon of a separator occurs at a 190° C. calendering process for increasing the strength of the separator, to thereby cause a clogging problem of pores.

That is, when a lamination temperature is too low, a web becomes too bulky to have stiffness. Meanwhile, when the lamination temperature is too high, the web is dissolved to cause pores to be clogged. In addition, thermal compression should be done at a temperature at which a solvent remaining in the web can be completely evaporated. Here, if too a small amount of the solvent is evaporated, a melting phenomenon of the web may occur.

In addition, in the case that PAN (polyacrylonitrile) that is the heat-resistant polymer material exceeds 70 wt %, a problem of weakening a tensile strength occurs in terms of a brittle nature of the heat-resistant polymer of the separator.

Moreover, the Korean laid-open patent publication No. 2008-13208 disclosed formation of an ultrafine fiber web by simply electrospinning a mixed solution of a heat-resistant polymer material and a swelling polymer material in the description of an embodiment of the invention proposed in the Korean laid-open patent publication No. 2008-13208. However, in this case, evaporation of a solvent rapidly proceeds during formation of fibers due to nature of the heat-resistant polymer, to thus cause the fibers to be dried very quickly. Accordingly, it is possible to form fibers in a spin nozzle pack of 1 to 10 holes, but fibers are not collected while flying if a multi-hole spin nozzle pack of more than 10 holes for mass production. As a result, since the separators that are obtained by using the multi-hole spin nozzle pack become too bulky, it may be difficult to form the separators and may act as a cause of the trouble of the spin.

In addition, when a mixed solution of a heat-resistant polymer material and a swelling polymer material is electrospinned, the internal temperature/humidity of a spinning chamber makes a big influence upon evaporation of the solvent depending on the polymer, to accordingly cause a problem that fibers are not formed. However, the Korean laid-open patent publication No. 2008-13208 does not refer to the above-described problem.

Furthermore, the ultrafine fibrous web obtained by the electrospinning method increases the pores in the case that a pretreatment process of adjusting an amount of the solvent and the moisture remaining on the surface of the web does not undergo before a laminating process, but may cause a phenomenon that the web is melted in the case that the web's strength is weakened or evaporation of the solvent takes place too slowly.

To solve the above problems or defects, it is an object of the present invention to provide an ultrafine fibrous porous separator having a small thermal shrinkage, a heat-resistance performance, and an excellent mechanical strength using an air-electrospinning (AES) method for use in a secondary battery having a high safety, an excellent cycle characteristic, a high energy density, and a high capacity, and a secondary battery using the same.

It is another object of the present invention to provide an ultrafine fibrous porous separator and a manufacturing method thereof in which the heat-resistant and high-strength ultrafine fibrous porous separators can be mass-produced using an air-electrospinning (AES) method.

It is still another object of the present invention an ultrafine fibrous porous separator that, increases web's strength and adjusts pores of the separator by undergoing a pretreatment process of adjusting an amount of the solvent, and the moisture remaining on the surface of the ultrafine fibrous porous web before laminating.

Technical Solution

To accomplish the above and other objects of the present invention, according to an aspect of the present, invention, there is provided an ultrafine fibrous porous separator with heat-resistance and high-strength, comprising a porous polymer web made of an ultrafine fiber that is obtained by air-electrospinning a mixed solution of 50 to 70 wt % of a heat-resistant polymer material whose melting point is 180° C. or higher and 30 to 50 wt % of a swelling polymer material that is swollen in an electrolyte.

Preferably but not necessary, an air pressure applied to a nozzle of a spin nozzle pack during the air-electrospinning is set in the range of 0.1 to 0.6 Mpa.

Preferably but not necessary, a tensile strength of the separator ranges from 20 to 27 Mpa, the modulus of elasticity ranges from 900 to 960 Mpa, and a bond strength ranges from 600 to 660 cN/25 mm.

Preferably but not necessary, diameter of the fiber is in the range of 0.3 to 1.5 um and thickness of the separator is in the range of 10 to 50 μm.

Preferably but not necessary, the porous polymer web is made of polyacrylonitrile (PAN) and polyvinylidene fluoride (PVdF).

Preferably but not necessary, the ultrafine fibrous porous separator further comprises an inorganic additive in which the inorganic additive is at least one selected from the group consisting of SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, PTFE, and any mixtures thereof.

A secondary battery can be made of the porous separator in which the secondary battery comprises:

two different electrodes;

a heat-resistant and high-strength ultrafine fibrous porous separator containing an ultrafine fiber obtained by air-electrospinning a mixed solution of 50 to 70 wt % of a heat-resistant polymer material and 30 to 50 wt % of a swelling polymer material that are interposed between the two different, electrodes; and an electrolytic solution or an electrolyte.

Preferably but not necessary, the separator is integrally formed with at least one of the two different electrodes.

Preferably but not necessary, the secondary battery is one of a lithium ion secondary battery, a lithium-ion polymer secondary battery, and a super-capacitor.

According to another aspect of the present invention, there is provided a heat-resistant and high-strength ultrafine fibrous porous separator comprising the steps of:

air-electrospinning a mixed solution of 50 to 70 wt % of a heat-resistant polymer material and 30 to 50 wt % of a swelling polymer material, to thereby form a porous web made of a heat-resistant ultrafine fiber in which the heat-resistant polymer material and the swelling polymer material are consolidated in an ultrafine fibrous form; and performing thermal compression of the porous web so as to obtain the separator.

Preferably but not necessary, the porous separator manufacturing method further comprises the step of performing drying to control a solvent and moisture that remain on the surface of the porous web prior to performing the thermal compression, to thereby control the strength and porosity of the separator.

According to still another aspect of the present invention, there is provided a heat-resistant and high-strength ultrafine fibrous porous separator comprising the steps of:

air-electrospinning a mixed solution of a heat-resistant polymer material and a swelling polymer material, to thereby form a porous web made of a heat-resistant ultrafine fiber in which the heat-resistant polymer material and the swelling polymer material are consolidated in an ultrafine fibrous form;

performing drying to control a solvent and moisture that remain on the surface of the porous web, to thereby control the strength and porosity of the separator; and performing thermal compression of the dried porous web so as to obtain the separator.

Preferably but not necessary, the thermal compression temperature is set at a temperature between 170° C. and 210° C.

Preferably but not necessary, an air pressure applied to a nozzle of a spin nozzle pack during the air-electrospinning is set in the range of 0.1 to 0.6 Mpa.

Preferably but not necessary, an internal temperature and a humidity in a spinning chamber where the air-electrospinning takes place are set to an allowable temperature limit of 30 to 40° C. and an allowable humidity limit of 40 to 70%, respectively.

Preferably but not necessary, the allowable temperature limit is set as 34±3° C., and the allowable humidity limit is set as 55±10% in the case that the heat-resistant polymer material and the swelling polymer material are a combination of polyacrylonitrile (PAN) and polyvinylidene fluoride (PVdF), respectively.

Preferably but not necessary, the air-electrospinning is performed by stirring the heat-resistant polymer material and the swelling polymer material in a mixing tank to prevent a phase separation, until the heat-resistant polymer material and the swelling polymer material are mixed with a solvent to then be spinned.

Preferably but not necessary, the air-electrospinning is performed by an independent air spray that takes place for respective spinning nozzles using a multi-hole spin nozzle pack.

Preferably but not necessary, the heat-resistant polymer material is a heat-resistant polymer resin that is any one selected from the group consisting of: aromatic polyester containing at least one of polyacrylonitrile (PAN), polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes containing at least one of poly tetrafluoroethylene, polydiphenoxy phosphazene, poly {bis [2-(2-methoxyethoxy) phosphazenel}; polyurethane copolymer containing at least one of polyurethane and polyether urethane; cellulose acetate, cellulose acetate butylrate, cellulose acetate propionate, polyester sulfone (PES), and polyether imide (PEI) and any one combination thereof.

Preferably but not necessary, the swelling polymer material is a swelling polymer resin that is any one selected from the group consisting of: polyvinylidene fluoride (PVDF), poly (vinylidene fluoride-co-hexafluoropropylene), perfluoropolymer, polyvinyl chloride or polyvinylidene chloride, and copolymer thereof; polyethylene glycol derivatives containing at least one of polyethylene glycol dialkylether and polyethylene glycol dialkyl ester; polyoxide containing at least one of poly (oxymethylene-oligo-oxyethylene), polyethylene oxide and polypropylene oxide; polyacrylonitrile copolymer containing at least one of polyvinyl acetate, poly (vinyl pyrrolidone-vinyl acetate), polystyrene, polystyrene acrylonitrile copolymer, and polyacrylonitrile methyl methacrylate copolymer; and polymethyl methacrylate and polymethyl methacrylate copolymer, and any one combination thereof.

The separator is made of polyacrylonitrile (PAN) and polyvinylidene fluoride (PVdF)

Advantageous Effects

As described above, the present invention provides an ultrafine fibrous porous separator having a small thermal shrinkage, a heat-resistance performance, and an excellent mechanical strength using an air-electrospinning (AES)

method for use in a secondary battery having a high safety, an excellent cycle characteristic, a high energy density, and a high capacity.

In addition, the present invention enables the heat-resistant and high-strength ultrafine fibrous porous separators to be mass-produced using an air-electrospinning (AES) method.

Furthermore, the present invention increases web's strength and adjusts pores of the separator by undergoing a pretreatment process of adjusting an amount of the solvent and the moisture remaining on the surface of the ultrafine fibrous porous web before laminating.

BEST MODE

Herein below, a heat-resistant and high-strength ultrafine fibrous porous separator in accordance with the present, invention will be described with reference to the accompanying drawings.

The heat-resistant and high-strength ultrafine fibrous porous separator according to the present, invention is made by an air-electrospinning (AES) method.

The separator is manufactured by the air-electrospinning (AES) method. The separator includes an ultrafine fiber obtained by air-electrospinning a heat-resistant polymer material whose melting point is 180° C. or higher and an ultrafine fiber obtained by air-electrospinning a swelling polymer material that is swollen in an electrolyte. Here, the fiber of the heat-resistant polymer material heightens a heat-resistance characteristic of the separator, and the fiber of the swollen polymer material enhances adhesion forces between the ultrafine fibrous separator and the respective electrodes, and increases an electrolyte supplement capability of the ultrafine fibrous separator, and also plays a role of heightening a tensile strength of the separator.

Figure 1:
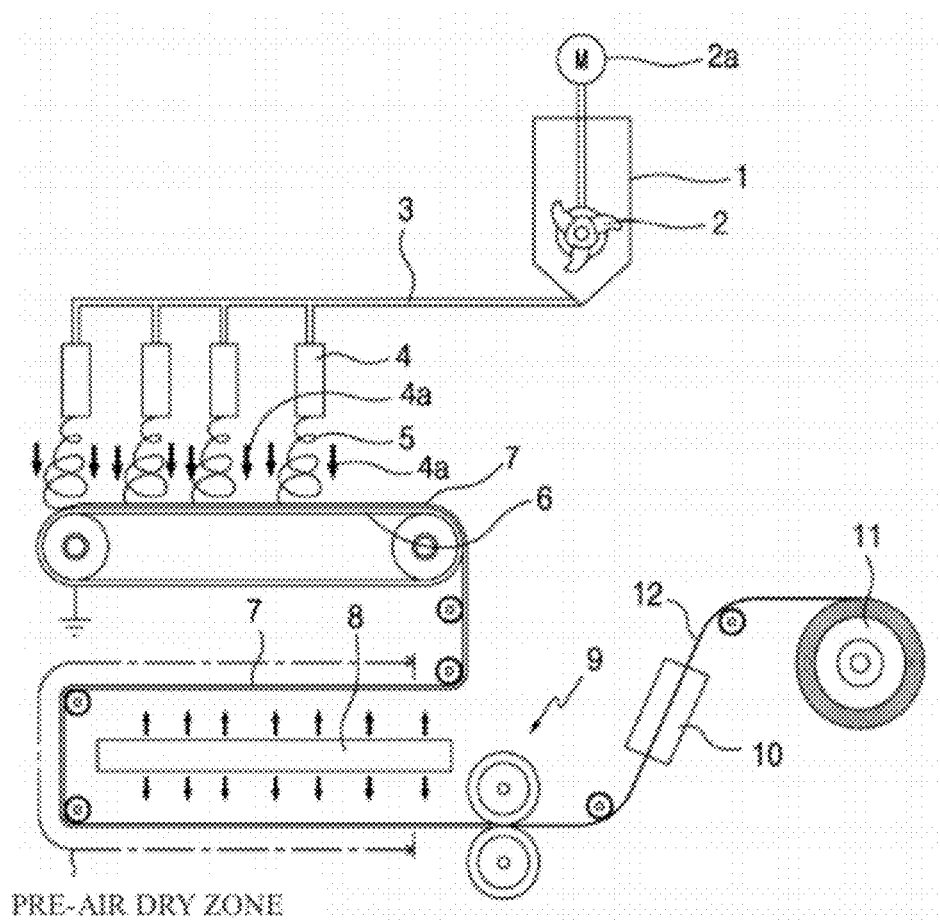
FIG. 1 is a schematic diagram illustrating a configuration of a separator manufacturing apparatus that is applied in the present invention.

A method of forming an ultrafine fibrous web according to the present invention is realized by using the separator manufacturing apparatus having an air-spray air-electrospinning device shown in FIG. 1.

According to the air-electrospinning (AES) method according to the present invention, if a high-voltage electrostatic force of 90 through 120 Kv is applied between each of spin nozzles 4 through which a polymer solution with a sufficient viscosity is spinned and a collector 6, an ultrafine fiber 5 is spinned to the collector 6, to thus form an ultrafine fiber web 7. In this case, if air is sprayed for each spin nozzle 4, the emanated fiber 5 is prevented from blowing without being captured by the collector 6.

An air-spray air-electrospinning device that is applied in the present, invention includes: a mixing tank 1 having an agitator 2 that uses a mixing motor 2a using a pneumatic pressure as a driving source; and a number of spin nozzles 4 that are connected with a high-voltage generator, in order to prevent a phase separation, until a heat-resistant polymer material and a swelling polymer material are mixed with a solvent to then be spinned. A polymer solution that is discharged through a number of the spin nozzles 4 that are connected with the mixing tank 1 via a fixed quantity pump (not shown) and a transfer tube 3 passes through the spinned nozzles 4 that are electrically charged by the high-voltage generator to then be discharged as the ultrafine fiber 5. Thus, the ultrafine fiber 5 is accumulated on the collector 6 that is grounded and is configured in a conveyor belt form that moves at a constant speed, to thereby form a porous web 7.

In this case, if a spinning solution mat includes the heat-resistant polymer or only the heat-resistant polymer is spinned, evaporation of a solvent rapidly proceeds during formation of fibers due to nature of the heat-resistant polymer, differently from the swelling polymer material, to thus cause the fibers to be dried very quickly.

Therefore, in the case of using the typical electrospinning method that has been referred to in the Korean laid-open patent publication No. 2008-13208, it is possible to form fibers in a spin nozzle pack of 1 to 10 holes, but fibers are not collected while flying if a multi-hole spin nozzle pack of more than 10 holes for mass production. As a result, since the separators that are obtained by using the multi-hole spin nozzle pack become too bulky, it may be difficult to form the separators and may act as a cause of the trouble of the spin.

Taking this into consideration, according to the present invention, as illustrated in FIG. 1, a multi-hole spin nozzle pack is used, to thus produce the porous web 7 by the air-electrospinning method of performing air spray for each spin nozzle 4. In addition, a number of the spin nozzles 4 are disposed along the advancing direction of the collector 6 in FIG. 1, but a number of the spin nozzles 4 are disposed in the direction perpendicular to the advancing direction of the collector 6 in the multi-hole spin nozzle pack.

In other words, according to the present invention, when electrospinning is accomplished by the air-electrospinning method, air spray is executed from the outer circumference of the spin nozzle air, to thus play a dominant role of allowing air to trap and accumulate fibers made of a rapidly volatile polymer, to thereby produce separators with high stiffness, and to accordingly minimize a spin trouble that fibers can cause while flying.

An air pressure applied to a nozzle of a multi-hole spin nozzle pack during the air-spray is set in the range of 0.1 to 0.6 Mpa. In this case, the air pressure that is less than 0.1 MPa does not contribute to a trapping/accumulation, and the air pressure that exceeds 0.6 Mpa hardens cone of the spin nozzle firmly to thus raise a phenomenon of blocking the needle thereby causing a spin trouble.

In particular, when a mixture of PAN and PVdF is used as the heat-resistant, polymer material and the swelling polymer material, the air pressure is preferably set to 0.25 MPa.

When the heat-resistant polymer material and the swelling polymer material are mixed with a solvent to thus form a spinning solution, it is necessary to agitate the spinning solution to prevent a phase separation until spinning is terminated after being started. Thus, it is preferable that a mixing tank 1 that mixes the heat-resistant polymer material and the swelling polymer material with the solvent uses for example an electrical insulation material of a plastic material such as MC nylon and acetal that accomplishes an electrical insulation when a high-voltage spinning is made. In addition, an agitator 2 that is used for stirring the spinning solution preferably uses a pneumatic mixing motor 2a as a driving source since an electric motor can be destroyed by a high voltage. In this case, the agitator 2 can be set to 1 to 500 RPM.

In the present invention, in order to form a porous web made of an ultrafine fiber from the mixed solution of the heat-resistant polymer material and the swelling polymer material by using the air-electrospinning (AES) method, 50 to 70 wt % of the heat-resistant polymer material and 30 to 50 wt % of the swelling polymer material are first added in a two-component-system solvent or a single-component-system solvent to thus produce a mixed spinning solution.

In the case that the swelling polymer material (for example, polyvinylidene fluoride (PVdF)) is contained at a ratio of more than 50 wt %, a melting phenomenon of a separator occurs at a 190° C. calendering process for increasing the strength of the separator, to thereby cause a clogging problem of pores.

In addition, in the case that the heat-resistant polymer material (for example, PAN (polyacrylonitrile)) exceeds 70 wt %, a problem of weakening a tensile strength occurs in terms of a brittle nature of the heat-resistant polymer of the separator. Thus, the swelling polymer material applied in the present invention is set to be in the range of 30-50 wt % with respect to the whole polymer materials contained in the spinning solution.

Here, the heat-resistant polymer material is made of a polymer material whose melting point is 180° C. or higher and that can be spinned, and the fiber of the heat-resistant polymer material heightens a heat-resistance characteristic of the separator, and the swollen polymer material is made of a polymer material that is swollen in an electrolyte and the fiber of the swollen polymer material enhances adhesion forces between the ultrafine fibrous separator and the respective electrodes, and increases an electrolyte supplement, capability of the ultrafine fibrous separator, and also plays a role of heightening a tensile strength of the separator.

The heat-resistant polymer resin that can be used in the present invention is a resin that can be dissolved in an organic solvent for electrospinning and whose melting point is 180° C. or higher, for example, any one selected from the group consisting of: aromatic polyester containing at least one of polyacrylonitrile (PAN), poly amide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes containing at least one of polytetrafluoroethylene, polydiphenoxy phosphazene, poly {bis [2-(2-methoxyethoxy) phosphazene]}; polyurethane copolymer containing at least one of poly urethane and poly ether urethane; cellulose acetate, cellulose acetate butylrate, cellulose acetate propionate, polyester sulfone (PES), and polyether imide (PEI) and any one combination thereof.

The swollen polymer material that can be used in the present invention is a resin that is swollen in an electrolyte, and can be formed into an ultrafine fiber by an electrospinning method, for example, any one selected from the group consisting of: polyvinylidene fluoride (PVDF), poly (vinylidene fluoride-co-hexafluoropropylene), perfluoropolymer, polyvinyl chloride or polyvinylidene chloride, and copolymer thereof; polyethylene glycol derivatives containing at least one of polyethylene glycol dialkylether and polyethylene glycol dialkyl ester; poly oxide containing at least one of poly (oxymethylene-oligo-oxyethylene), polyethylene oxide and polypropylene oxide; polyacrylonitrile copolymer containing at least one of polyvinyl acetate, poly (vinyl pyrrolidone-vinyl acetate), polystyrene, polystyrene acrylonitrile copolymer, and polyacrylonitrile methyl methacrylate copolymer; and polymethyl methacrylate and polymethyl methacrylate copolymer, and any one combination thereof.

In addition, it is preferable to use a two-component-system mixed solvent where a high boiling point solvent and a low boiling point solvent as a solvent that is mixed with the heat-resistant polymer material and the swelling polymer material in order to prepare the mixed spinning solution.

In the case of the two-component-system mixed solvent that is applied in the present invention, a high boiling point solvent and a low boiling point solvent are preferably mixed, at a weight ratio ranging from 7:3 to 9:1. If the high boiling point solvent is less than 7, a problem that the polymer is not completely dissolved, and if the high boiling point solvent exceeds 9, the low boiling point solvent is too small to evaporate the solvent from the spinned fiber to thereby cause a problem that a web is not smoothly formed.

If only the high boiling point solvent is used, spinning is not performed but spray is performed, to thus form non-fiber particles. Otherwise, even if spinning is performed, a number of beads are formed and the solvent is not evaporated well, to accordingly cause a melting phenomenon of a separator at a calendering process of a web and to thereby cause a clogging problem of pores.

In addition, when only the low boiling point solvent is used, the solvent is evaporated very rapidly. As a result, a number of small fibers are produced in the needle of the spinning nozzle, to thus act as a cause of a spinning trouble.

In general, although a single solvent is used in the examples 1-1 through 1-4 of the Korean laid-open patent publication No. 2008-13208, a big problem does not happen in the case that a single hole spinning nozzle of a laboratory scale is used, but an interference phenomenon occurs between the fibers spinned from a mass-production type multi-hole pack nozzle unit, to thus influence upon evaporation of the solvent. As a result, If spinning is performed by using the multi-hole pack nozzle unit, evaporation of the solvent is not accomplished well. Accordingly, spinning is not accomplished in a fibrous form but spray spinning is performed to thereby cause a problem that spinning is accomplished in a particle form.

In the case that the heat-resistant polymer material and the swelling polymer material are PES and PVdF, respectively, in the present invention, the two-component-system mixed solvent is made by mixing DMAc (N,N-dimethylacetoamide; BP-165° C.) as a high boiling point solvent and acetone (BP-56° C.) as a low boiling point solvent, at a weight ratio of 9:1. Meanwhile, in the case that the heat-resistant polymer material and the swelling polymer material are PEI and PVdF, respectively, the two-component-system mixed solvent is made by mixing NMP (N-methylpyrrolidone; BP-202~204° C.) and THF (Terahydrofuran; BP-67° C.) at a weight ratio of 9:1.

In this case, the mixing ratio between the two-component-system mixed solvent and the whole polymer is preferably set at a weight ratio approximately 8:2.

Meanwhile, when spinning is performed by the air-electrospinning (AES) method using the multi-hole pack nozzle unit, after the spinning solution has been prepared as described above, the internal temperature/humidity of a spinning chamber makes a big influence upon evaporation of the solvent from the spinned fiber. Accordingly, if appropriate conditions are not set, the internal temperature/humidity of the spinning chamber determines whether or not fibers are formed, and also determines diameter of the fibers and whether or not beads are formed.

In the case that the heat-resistant polymer material and the swelling polymer material are mixed and then spinned, an allowable temperature limit and an allowable humidity limit vary depending upon a polymer material. Here, the allowable temperature limit is set in the range of 30 to 40° C. and the allowable humidity limit is set in the range of 40 to 70%.

Here, the allowable temperature limit is set as 34±3° C., and the allowable humidity limit is set as 55±10% in the case that the heat-resistant polymer material and the swelling polymer material are a combination of polyacrylonitrile (PAN) and polyvinylidene fluoride (PVdF), respectively. Meanwhile, in the case that the heat-resistant polymer material and the swelling polymer material are polyacrylonitrile (PAN) and polyvinylidene fluoride (PVdF), respectively, the allowable temperature limit is set as 35° C., and the allowable humidity limit is set as 60%.

As described above, when the mixed solution of the heat-resistant polymer material and the swelling polymer material is electrospinned, the internal temperature/humidity of the spinning chamber makes a big influence upon evaporation of the solvent, depending on the polymer material, to accordingly cause a problem that fibers are not formed. However, the Korean laid-open patent publication No. 2008-13208 does not refer to the above-described problem.

When spinning is performed by the air-electrospinning (AES) method using the multi-hole pack nozzle unit, after the spinning solution has been prepared as described above, spinning of the ultrafine fibers of 0.3 to 1.5 um in diameter is performed, and the fibers are fused in a three-dimensional network structure simultaneously with creation of the fibers, to thereby form a porous web 7 of a layered structure. The porous web 7 made of the ultrafine fibers is ultra-thin and ultra-light and has a high ratio of a surface area compared to a volume and a porosity.

The thus-obtained porous web 7 undergoes a process of adjusting an amount of a solvent and the moisture remaining on the surface of the web 7, while passing through a pre-air dry zone by a pre-heater 8. Then, calendering process is done using a heating compression roller 9.

In the pre-air dry zone by the pre-heater 8, air of 20 to 40° C. is applied to the web 7 by using a fan, thereby adjusting an amount of a solvent and the moisture remaining on the surface of the web 7. As a result, the web 7 is controlled so as to be prevented from being bulky. The air blow of the fan plays a role of increasing strength of the separator and control porosity of the separator.

In this case, if calendering is accomplished at a state where evaporation of the solvent has been excessively performed, porosity is increased but strength of the web is weakened. Reversely, if less evaporation of the solvent occurs, the web is melted.

The porous web calendering process following the pre-air dry-process is performed using the heating compression roller 9. In this case, if the calendering temperature is too low, the web becomes too bulky to have stiffness, and if the calendering temperature is too high, the web is melted to thus clog the pores.

In addition, the thermal compression should be performed at a temperature that the solvent remaining in the web can be completely evaporated. If too little evaporation of the solvent occurs, the web is melted.

In general, in order to achieve a stable shrinkage at 150° C. being the heat-resistant temperature required in the secondary battery, thermal compression is preferably executed at 150° C., or higher to thus ensure stability of the separator 12.

For this purpose, in the present invention, the heating compression roller 9 is set to be a temperature of 170 to 210° C. and a pressure of 0 to 40 kgf/cm$^2$ except for dead weight pressure of the compression roller, to then perform calendering of the porous web 7 and execute a primary pre-shrinkage, and to thereby maintain stabilization of the separator at the time of an actual use.

In the case that the heat-resistant polymer material and the swelling polymer material are a combination of polyacrylonitrile (PAN) and polyvinylidene fluoride (PVdF), respectively, the calendering temperature and pressure combinations are as follows:

Combination of PAM and PVdF: 170 to 210° C. and 20 to 30 kgf/cm$^2$

Once the web calendering process is executed, the separator of 10 to 50 μm thick is obtained.

In addition, the separator 12 obtained by the calendering process carried out as necessary in the present invention, undergoes a process of removing the remaining solvent or moisture by using a secondary hot-air dryer 10 at a temperature 100° C. and with a wind speed of 20 m/sec, to then be wound on a winder 11 as a separator roll.

In the description of the above embodiment, the separators 6 is spinned on the collector 6 to thus form an ultrafine fibrous web 7, and then is separated from the collector 6 to then undergo the calendering process. However, the separators 6 may be directly spinned on the anode or cathode that configures the secondary battery to then undergo the calendering process.

According to the present invention, an average diameter of the fiber constituting the heat-resistant ultrafine fibrous separator makes a big influence upon porosity of the separator and distribution of pores in size. The smaller the diameter becomes, the smaller pore size becomes, and the smaller the pore size distribution becomes.

In addition, the smaller the diameter of fibers, the more the specific surface area of the fiber increases. Accordingly, the electrolyte supplement capability becomes large, so possibility of electrolyte leakage is reduced. Therefore, diameter of the fiber constituting the heat-resistant ultrafine fibrous separator in the present invention is in the range 0.3 to 1.5 um.

Thickness of the separator is in the range of 10 to 50 μm, and is preferably in the range of 10 to 30 μm.

In addition, porosity of the separator has a range of 55 to 70%.

The tensile strength of the separator is in the range of 20 to 27 Mpa, the modulus of elasticity thereof is in the range of 900 to 960 Mpa, and bond strength thereof indicates the range of 600 to 660 cN/25 mm.

In the present invention, in order to enhance the heat-resistance characteristic, mechanical properties, ionic conductivity and electrochemical characteristic of the separator, inorganic additives may be contained by 30 to 70 wt %, preferably by 30 to 50 wt %. In the case that less than 30 wt % of inorganic additives are contained, an effect of enhancing the heat-resistance characteristic and the mechanical properties is low. In the case that more than 70 wt % of inorganic additives are contained, the trouble may happen at the time of spinning the spinning solution.

Available inorganic additives are, for example, at least one selected from the group consisting of $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, PTFE, SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2PO_7$, $Sn_2B_2O_5$, and $Sn_2BPO_6$ and any mixtures thereof.

Meanwhile, a secondary battery according to the present invention greatly includes a cathode, an anode, a separator and an electrolyte.

The cathode includes a cathode active material layer formed on one surface or both surfaces of a cathode collector, and the anode includes an anode active material layer formed on one surface or both surfaces of an anode collector.

The anode active material layer includes an anode active material that intercalates and deintercalates lithium ions reversibly. Lithium-transition metal oxides such as $LiCoO_2$, $LiNiO_2$, $LiMnO_2$, $LiMn_2O_4$, or $LiNi_{1-x-y}Co_xM_yO_2$ ($0 \leq x \leq 1$, $0 \leq y \leq 1$, $0 \leq x+y \leq 1$, M is metal of Al, Sr, Mg, La, and so on) can be used as a typical example of these anode material. However, it is also possible to use other types of anode materials in addition to the anode active material in the present invention.

The cathode active material layer includes a cathode active material that intercalates and deintercalates lithium ions reversibly. A carbon-containing cathode active material such as crystalline or amorphous carbon, or a carbon composite can be used as the cathode active material. However, the present invention is not limited to the cathode active material types.

The electrolyte solution includes a non-aqueous organic solvent, wherein carbonate, ester, ether or ketone can be used as the non-aqueous organic solvent. The carbonate includes at least one selected from the group consisting of dimethyl carbonate (DMC), diethyl carbonate (DEC), dipropyl carbonate (DPC), methylpropyl carbonate (MPC), ethylpropyl polycarbonate (EPC), methylethyl carbonate (MEC), ethylene carbonate (EC), propylene carbonate (PC), and butylene carbonate (BC). The ester includes at least one selected from the group consisting of butyrolactone (BL), decanolide, valerolactone, mevalonolactone, caprolactone, n-methyl acetate, n-ethyl acetate, and n-propyl acetate. The ether may be dibutyl ether. The ketone may be polymethylvinylketone. However, the present invention is not limited to the non-aqueous organic solvent types.

Moreover, the electrolyte according to the present invention includes a lithium salt. The lithium salt acts as a source of lithium ions within a battery cell, to thereby enable operation of a basic lithium battery. For example, the lithium salt includes at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ (Here, x and y are the natural numbers) and $LiSO_3CF_3$ selected and any mixtures thereof.

As described above, an electrode assembly is formed by combination of the anode, cathode, and separator and then is contained in an aluminum or aluminum alloy can or a similar container. Then, the opening of the can is capped with a cap assembly. Then, an electrolyte is injected into the can to thus produce a lithium secondary battery.

Meanwhile, the separator according to the present invention can be applied to a secondary battery including a lithium-ion polymer battery and a super-capacitor (that is an electric double layer capacitor or a pseudo capacitor) as well as a lithium-ion secondary battery. The secondary battery includes a pair of electrodes, a separator and an electrolyte.

The super-capacitor includes an anode, a cathode, an electrolyte and a separator. Each of the cathode and the anode consists of an electric current collector and an active material.

Any conventional active materials that are known as capacitor active materials can also be used as electrode active materials. For example, conductive nano-carbon particles or porous carbon materials such as carbon black (CB), Super-P, acetylene black, fine graphite powder, carbon nano-tubes (CNT), or fibrous carbon whiskers or fibers, vapor grown carbon fibers (VGCF), carbon nano-fibers, and carbon aerogel can be used a main ingredient of an electric double layer capacitor.

Metal oxides such as ruthenium oxide, iridium oxide, tantalum oxide, and vanadium oxide can be used as the pseudo capacitor. The conductive polymer such as polyaniline, polypyrrole, and polyacene can be used as the conductive polymer capacitor.

The solvent used in the electrolyte may be at least one selected from the group consisting of acetonitrile, dimethyl ketone, and propylene carbonate. The electrolyte used in the electrolytic solution includes alkali metal salts that are electrically inactive in the super-capacitor operating voltage range and that have solubility of 0.01 mole/L or more with respect to the solvent. For example, the alkali metal salts may be lithium percolate, lithium tetrafluorobolate, and lithium hexafluorophosphate. The electrolytic solution can contain additional additives to improve the properties of the super-capacitor. For example, the additional additives may be stabilizers, thickeners, etc.

The separator plays a role of dividing the inner space of the super-capacitor into a cathode electrode and an anode electrode, and can be placed between the cathode and anode electrodes to prevent short circuit.

Hereinafter, embodiments of the present Invention will be described in more detail. However, the following embodiments of the present invention are nothing but examples, and the scope of the invention is not limited thereto.

Example 1

—PAN/PVdF (5/5) 20 wt %—DMAc Solution

In order to manufacture a separator made of heat-resistant nano-fibers by an air-electrospinning (AES) method, polyacrylonitrile (PAN) of 5.5 g and polyvinylidene fluoride (PVdF) of 5.5 g were added to dimethylacetamide (DMAc) of 89 g, and stirred at 80° C., to thus have prepared a spinning solution made of a heat-resistant, polymer and a swelling polymer.

The spinning solution consists of different, phases from each other with respect to the heat-resistant polymer and the swelling polymer. Accordingly, phase separation can occur rapidly. The spinning solution was put into a mixing tank stirred using a pneumatic motor to then discharge the polymer solution by 17.5 ul/min/hole. Here, temperature of the spinning section was maintained at 36° C. and humidity thereof was maintained to 60%, while applying a voltage of 100 KV to a nozzle of a spin nozzle pack using a high voltage generator and at the same time an air pressure of 0.25 MPa to a nozzle of the spin nozzle pack, to thus have manufactured an ultrafine fiber web with a mixture of PAN and PVdF.

In order to increase strength of the thus-prepared ultrafine fiber web, the ultrafine fiber web was made to pass through a primary pre-air dry zone in which air of 30° C. were circulating at a speed of 30 m/sec, in a running time (RT) of 5 min/m, to thereby have adjusted the solvent and moisture remaining on the surface of the ultrafine fiber web. The thus-adjusted ultrafine fiber web was moved to a calendering device, to thus have performed a calendering process by using heating/pressurizing rolls with conditions of temperature of 190° C. and pressure of 20 kgf/$cm^2$. Then, in order to remove the solvent and moisture that may remain, the ultrafine fiber web was made to pass through a secondary hot-air dryer at a temperature of 100° C. and with a wind speed of 20 m/sec. to thus have obtained a separator. The thus-obtained separator was wound on a winder. An enlarged image of the obtained separator was photographed by Scanning Electron Microscopy (SEM) and shown in FIG. 2.

In addition, in order to evaluate change of physical properties of the separator depending upon the compression temperature during calendering, the compression temperature were varied into 150° C., 170° C., 190° C., 210° C., and 230° C. while calendering, to thus have obtained a separator. Various physical properties such as tensile strength, elastic modulus, bond strength, average pore size, and air permeability of the separator were measured and shown in Table 1.

Figure 3:
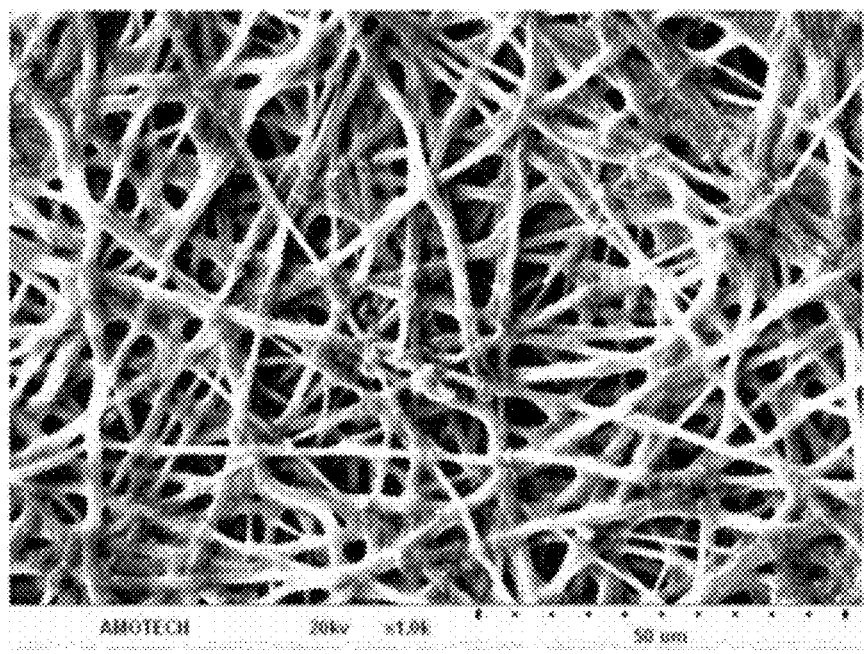
FIGS. 3 and 4 show photographs obtained by magnifying respective separators by 1000 times after an impregnation test of a separator obtained according to Example 1 and a separator obtained according to Comparative Example 3.

Subsequently, the separator was dipped into the electrolyte of EC/DEC 1 M LiPF$_6$ for 24 hours in order to evaluate the electrolyte impregnation performance. The results were taken by SEM and shown in FIG. 3.

Figure 5:
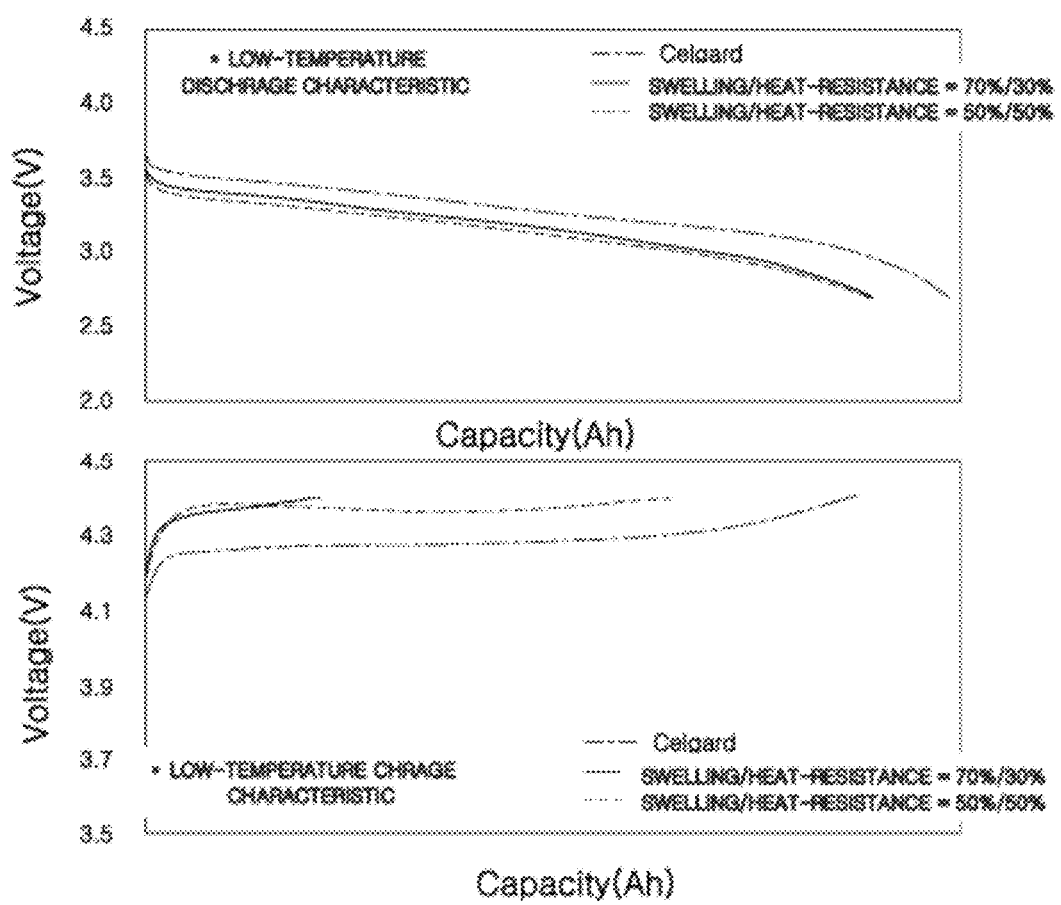
FIG. 5 shows graphs showing a low-temperature discharge characteristic and a low-temperature charge characteristic of the separators according to Example 1 and Comparative Example 3.

In addition, charge/discharge experiments were performed at −30° C. with 1 C, and then a low-temperatures discharge characteristic graph and a low-temperatures charge characteristic graph were shown in FIG. 5.

Example 2

—PAN/PVdF (7/3) 20 wt %—DMAc Solution

In Example 2, a separator was manufactured in the same manner as in Example 1, except that a spinning solution was prepared by changing a mixture ratio of PAN/PVdF into a weight ratio of 7:3.

In other words, polyacrylonitrile (PAN) of 7.7 g and polyvinylidene fluoride (PVdF) of 3.3 g were added to dimethylacetamide (DMAc) of 89 g, and stirred at 80° C., to thus have prepared a spinning solution made of a heat-resistant polymer and a swelling polymer.

After having manufactured the separator in the same manner as in Example 1 by using the spinning solution, various physical properties were measured and shown in Table 1.

Comparative Example 1

—PAN/PVdF (75/25) 20 wt %—DMAc Solution

In Comparative Example 1, a separator was manufactured in the same manner as in Example 1, except that a spinning solution was prepared by changing a mixture ratio of PAN/PVdF into a weight ratio of 7.5:2.5.

In other words, polyacrylonitrile (PAN) of 8.25 g and polyvinylidene fluoride (PVdF) of 2.75 g were added to dimethylacetamide (DMAc) of 89 g, and stirred at 80° C., to thus have prepared a spinning solution made of a heat-resistant polymer and a swelling polymer.

After having manufactured the separator in the same manner as in Example 1 by using the spinning solution, various physical properties were measured and shown in Table 1.

Comparative Example 2

—PAN (100) 20 wt %—DMAc Solution

In Comparative Example 2, a separator was manufactured in the same manner as in Example 1, except that a spinning solution was prepared by using only heat-resistant polymer PAN without having mixed a heat-resistant polymer and a swelling polymer, and then various physical properties of the obtained separator were measured and shown in Table 1.

Comparative Example 3

—PAN/PVdF (3/7) 20 wt %—DMAc Solution

In Comparative Example 3, a separator was manufactured in the same manner as in Example 1, except that a spinning solution was prepared by changing a mixture ratio of PAN/PVdF into a weight ratio of 3:7.

In other words, polyacrylonitrile (PAN) of 3.3 g and polyvinylidene fluoride (PVdF) of 7.7 g were added to dimethylacetamide (DMAc) of 89 g, and stirred at 80° C., to thus have prepared a spinning solution made of a heat-resistant polymer and a swelling polymer.

Figure 2:
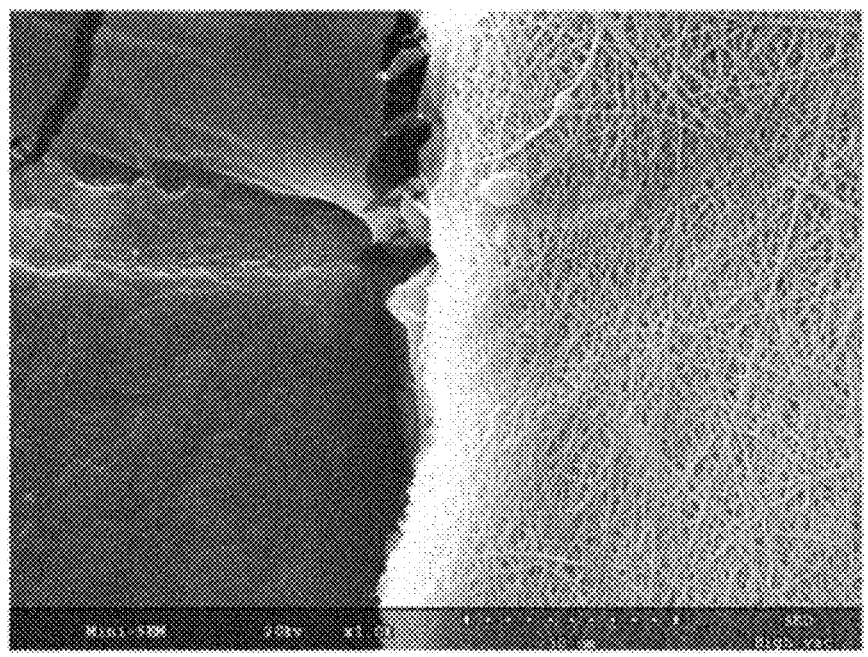
FIG. 2 shows a photograph obtained by magnifying by 1000 times a separator obtained according to Example 1 and a separator obtained according to Comparative Example 1.

After having manufactured the separator in the same manner as in Example 1 by using the spinning solution, an enlarged image of the obtained separator was photographed by Scanning Electron Microscopy (SEM) and shown in FIG. 2. The separator was dipped into the electrolyte of EC/DEC 1 M LiPF$_6$ for 24 hours in order to evaluate the electrolyte impregnation performance. The results were taken by SEM and shown in FIG. 4.

In addition, charge/discharge experiments were performed at −30° C. with 1 C, and then a low-temperatures discharge characteristic graph and a low-temperatures charge characteristic graph were shown in FIG. 5.

TABLE 1

| | Example 1 PVdF/PAN 50/50 wt % | | | | | Example 2 PVdF/PAN 30/70 wt % | Comparative Example 3 PVdF/PAN 25/75 wt % | Comparative Example 4 PAN 100 wt % |
|---|---|---|---|---|---|---|---|---|
| Compression temperature (° C.) | 150° C. | 170° C. | 190° C. | 210° C. | 230° C. | 190° C. | 190° C. | 190° C. |
| Tensile strength (Mpa) | 23.60 | 23.90 | 21.40 | 26.90 | 27.70 | 23.60 | 17.20 | 19.20 |
| Tensile expansion rate (%) | 16.30 | 9.40 | 6.00 | 12.00 | 6.20 | 16.80 | 14.60 | 13.30 |
| Elastic modulus (Mpa) | 791.00 | 900.50 | 956.30 | 937.60 | 1118.70 | 791.00 | 538.10 | 719.90 |
| Bond strength (cN/25 mm) | 426.30 | 651.20 | 648.20 | 621.60 | 527.60 | 426.30 | 36.20 | 26.70 |
| Weight (g/m$^2$) | 16.76 | 16.64 | 16.44 | 18.56 | 18.60 | 14.01 | 10.12 | 9.36 |
| Thickness (um) | 27.00 | 23.60 | 24.80 | 26.00 | 25.00 | 26.00 | 26.20 | 25.40 |
| Average pore (um) | 0.26 | 0.23 | 0.22 | 0.22 | 0.27 | 0.22 | 0.31 | 0.22 |

TABLE 1-continued

|  | Example 1 PVdF/PAN 50/50 wt % | | | | | Example 2 PVdF/PAN 30/70 wt % | Comparative Example 3 PVdF/PAN 25/75 wt % | Comparative Example 4 PAN 100 wt % |
|---|---|---|---|---|---|---|---|---|
| Air permeability (cfm) | 0.26 | 0.20 | 0.19 | 0.14 | 0.13 | 0.25 | 0.74 | 0.42 |

As can be seen from Table 1, if the heat-resistant polymer exceeds 70 wt % as in the case of the Comparative Example 1, when the heat-resistant polymer and the swelling polymer are mixed, it can be seen that the tensile strength, elastic modulus and bond strength of the separator fall significantly in comparison with Examples 1 and 2.

In addition, in the result of having varied the compression temperature into 150° C., 170° C., 190° C., 210° C., and 230° C. during calendering, it is desirable that calendering is made in the range of 170° C. to 210° C. in order to have the tensile strength, elastic modulus, and bond strength of all the resulting separators representing values of the optimum range.

Referring to FIG. 5, Example 1 that a weight ratio of the swelling polymer and the heat-resistant polymer was 50:50, indicates a low-temperature discharge characteristic and a low temperature charge characteristic similar to Celgard of Celgard, LLC, but Comparative Example 3 that a weight ratio of the swelling polymer and the heat-resistant polymer was 70:30, indicates that too much swelling occurred in the electrolyte and the high-temperature and low-temperature charge/discharge characteristics became worse.

Figure 4:
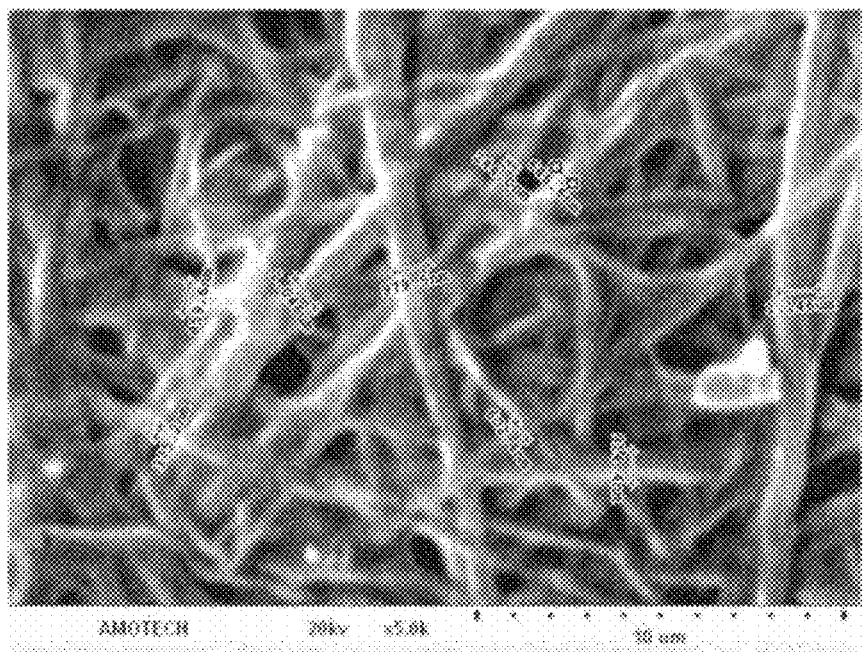

In other words, in the case that the swelling polymer of 70 wt % or more (preferably of 50 wt % or more) was contained as shown in Comparative Example 3, undergoing of the calendering process at more than 180° C. made the web melted as shown in FIG. 2. Further, the electrolyte was swollen too much as shown in FIG. 4. As a result, it can be seen that the high-temperature and low-temperature charge/discharge characteristics of the battery cell became worse (see FIG. 5).

Example 3

—PES/PVdF (6/4) 20 wt %—DMAc/Acetone=8/2 Solution

In order to manufacture a separator made of heat-resistant nano-fibers by an air-electrospinning (AES) method, polyethersulfone (PES) of 12 g and polyvinylidene fluoride (PVdF) of 8 g were added to a mixed solvent of 80 g obtained by mixing dimethylacetamide (DMAc) of 64 g and acetone of 16 g, and stirred at 100° C., to thus have prepared a spinning solution made of a heat-resistant polymer and a swelling polymer.

The spinning solution consists of different phases from each other with respect to the heat-resistant polymer and the swelling polymer. Accordingly, phase separation can occur rapidly. The spinning solution was put into a mixing tank stirred using a pneumatic motor to then discharge the polymer solution by 20 ul/min/hole. Here, temperature of the spinning section was maintained at 33° C. and humidity thereof was maintained to 65%, while applying a voltage of 100 KV to a nozzle of a spin nozzle pack using a high voltage generator and at the same time an air pressure of 0.2 MPa to a nozzle of the spin nozzle pack, to thus have manufactured an ultrafine fiber web with a mixture of PAN and PVdF.

Figure 6:
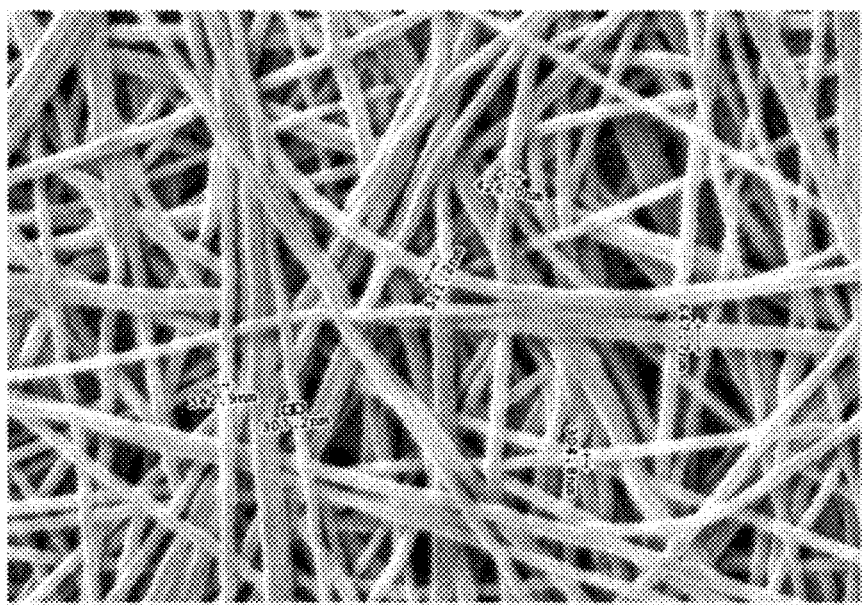
FIG. 6 shows a photograph obtained by magnifying a separator obtained according to Example 3.

In order to increase strength of the thus-prepared ultrafine fiber web, the ultrafine fiber web was made to pass through a primary pre-air dry zone in which air of 30° C. were circulating at a speed of 30 m/sec, in a running time (RT) of 4 min/m, to thereby have adjusted the solvent and moisture remaining on the surface of the ultrafine fiber web. The thus-adjusted ultrafine fiber web was moved to a calendering device, to thus have performed a calendering process by using heating/pressurizing rolls with conditions of temperature of 190° C. and pressure of 20 kgf/cm$^2$. Then, in order to remove the solvent and moisture that may remain, the ultrafine fiber web was made to pass through a secondary hot-air dryer at a temperature of 100° C. and with a wind speed of 20 m/sec, to thus have obtained a separator. The thus-obtained separator was wound on a winder. An enlarged image of the obtained separator was photographed by Scanning Electron Microscopy (SEM) and shown in FIG. 6.

Comparative Example 4

—PES/PVdF (6/4) 20 wt %—DMAc Solution

Polyethersulfone (PES) of 12 g and polyvinylidene fluoride (PVdF) of 8 g were added to dimethylacetamide (DMAc) of 80 g, and stirred at 100° C., to thus have prepared a spinning solution made of a heat-resistant polymer and a swelling polymer.

A nano-fiber web was manufactured in the same manner as in Example 3, and was made to pass through fibrous calender rolls mixed with a spray or bead before having through the calender rolls. As a result, a phenomenon of melting the nano-fiber web has occurred due to excessive beads.

Comparative Example 5

—PES/PVdF (6/4) 20 wt %—DMAc/Acetone=6/4 Solution

Polyethersulfone (PES) of 12 g and polyvinylidene fluoride (PVdF) of 8 g were added to a mixed solvent of 80 g obtained by mixing dimethylacetamide (DMAc) of 24 g and acetone of 56 g, and stirred at 100° C., to thus have prepared a spinning solution made of a heat-resistant polymer and a swelling polymer.

If the nano-fiber web was manufactured by the air-electrospinning (AES) method in the same manner as in Example 3, spinning is very unstable, to thus cause the fibers to fly and to make it difficult, to perform a spinning process for a long time.

Example 4

—PAN/PVdF (5/5) 11 wt %—DMAc Solution

In order to manufacture a separator made of heat-resistant nano-fibers by an air-electrospinning (AES) method, polyacrylonitrile (PAN) of 5.5 g and polyvinylidene fluoride (PVdF) of 5.5 g were added to dimethylacetamide (DMAc) of 89, and stirred at 80° C., to thus have prepared a spinning solution made of a heat-resistant polymer and a swelling polymer.

The spinning solution consists of different phases from each other with respect to the heat-resistant polymer and the swelling polymer. Accordingly, phase separation can occur rapidly. The spinning solution was put into a mixing tank stirred using a pneumatic motor to then discharge the polymer solution by 17.5 ul/min/hole. Here, temperature of the spinning section was maintained at 33° C. and humidity thereof was maintained to 60%, while applying a voltage of 100 KV to a nozzle of a spin nozzle pack using a high voltage generator and at the same time an air pressure of 0.25 MPa to a nozzle of the spin nozzle pack, to thus have manufactured an ultrafine fiber web with a mixture of PAN and PVdF.

In order to increase strength of the thus-prepared ultrafine fiber web, the ultrafine fiber web was made to pass through a primary pre-air dry zone in which air of 30° C. were circulating at a speed of 30 m/sec, in a running time (RT) of 5 min/m, to thereby have adjusted the solvent and moisture remaining on the surface of the ultrafine fiber web. The thus-adjusted ultrafine fiber web was moved to a calendering device, to thus have performed a calendering process by using heating/pressurizing rolls with conditions of temperature of 190° C. and pressure of 20 kgf/cm². Then, in order to remove the solvent and moisture that may remain, the ultrafine fiber web was made to pass through a secondary hot-air dryer at a temperature of 100° C. and with a wind speed of 20 m/sec, to thus have obtained a separator. The thus-obtained separator was wound on a winder.

Figure 7:
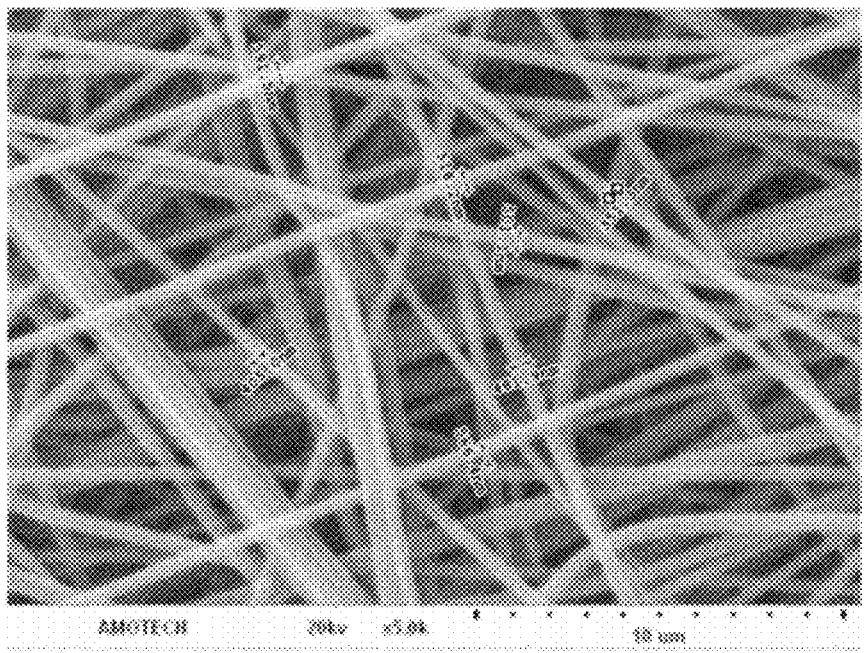
FIGS. 7 through 9 show photographs obtained by magnifying by 5000 times a separator obtained according to Example 4 and separators obtained according to Comparative Examples 7 and 8, respectively.

In the present invention, when an ultrafine fiber web with a mixture of PAN and PVdF was manufactured by having applied a voltage of 100 KV to a nozzle of a spin nozzle pack and at the same time an air pressure of 0.25 MPa to a nozzle of the spin nozzle pack, while temperature of the spinning section was maintained at 33° C. and humidity thereof was maintained to 60%, any spin troubles have not occurred in the spinning device. An enlarged image of the obtained separator was photographed by Scanning Electron Microscopy (SEM) and shown in FIG. 7.

Comparative Example 6

—PAN/PVdF (5/5) 11 wt %—DMAc Solution

A separator made of heat-resistant nano-fibers was manufactured by air-electrospinning a spinning solution in the same manner as in Example 4. Here, an air pressure that was applied to a nozzle of the spin nozzle pack was set to 0.05 Mpa, to thus have air-electrospinned the nano-fibers. The air pressure of 0.05 Mpa means that little air is used, to resultantly have raised spin troubles.

As described above, if the air pressure was 0.05 Mpa, a phenomenon of degrading density or concentration of fibers has occurred. Such a phenomenon made the fibers fly when spinning was made for a long time to thus have polluted the needles and to thereby have caused a clogging phenomenon of the needles and have become a cause of the troubles.

Comparative Example 7

—PAN/PVdF (5/5) 11 wt %—DMAc Solution

In Comparative Example 7, a separator was manufactured by the air-electrospinning method under the same conditions as those of Example 4, except that humidity in a spinning section was changed into 35%.

Figure 8:
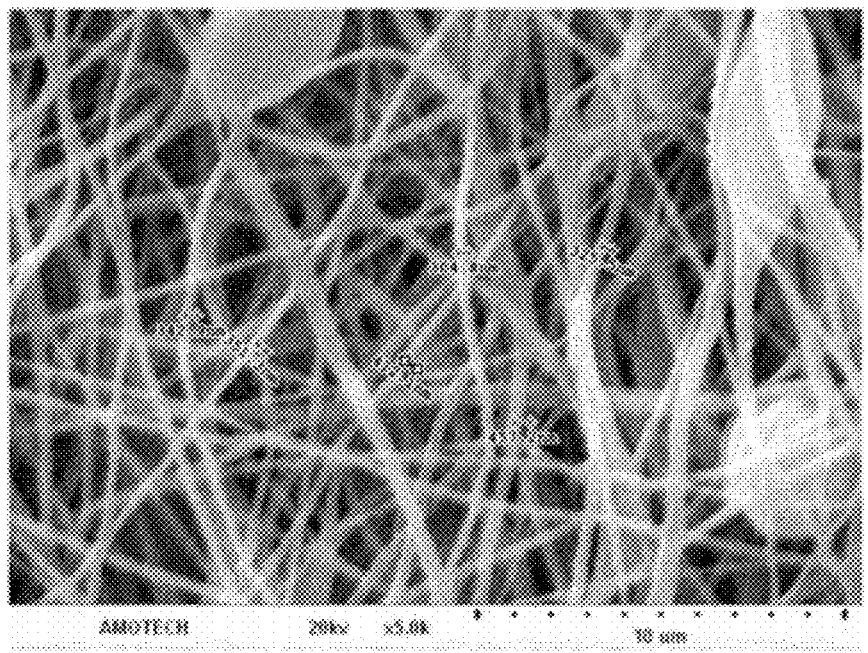

As a result, the thus-produced heat-resistant and swelling nano-fiber separator raised a number of beads. Further, fiber diameter was very unstable. An enlarged image of the obtained separator was photographed by Scanning Electron Microscopy (SEM) and shown in FIG. 8.

Comparative Example 8

—PAN/PVdF (5/5) 11 wt %—DMAc Solution

In Comparative Example 8, a separator was manufactured by the air-electrospinning method under the same conditions as those of Example 4, except that humidity in a spinning section was changed into 75%.

Figure 9:
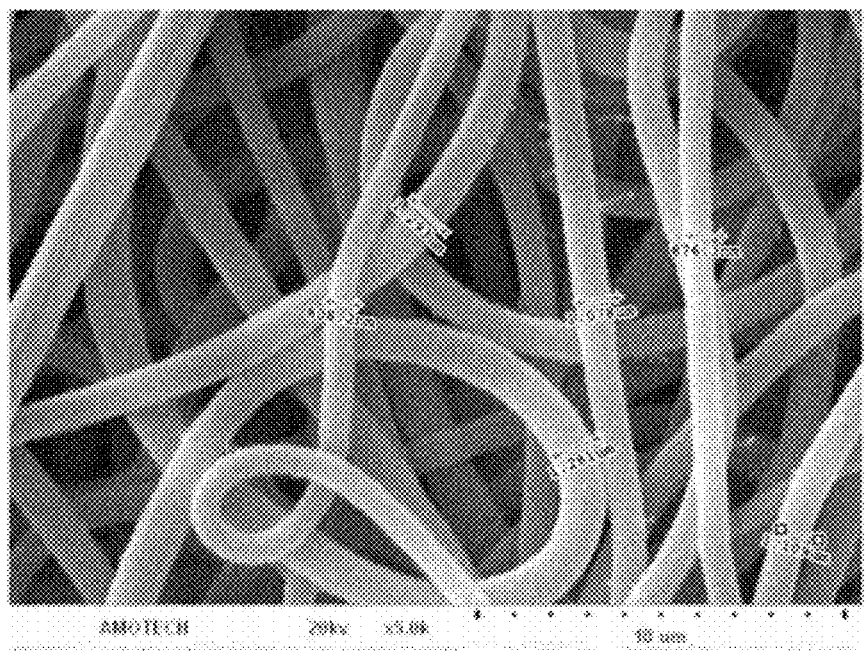

As a result, the manufactured separator consisting of the heat-resistant and swelling nano-fibers was very thick in fiber diameter, and became twisty. Thus, it was difficult to lower the average pore size. As described above, if the average porosity became large, probability of micro-shorts due to the electrode active material became high. An enlarged image of the obtained separator was photographed by Scanning Electron Microscopy (SEM) and shown in FIG. 9.

Example 5

Test of Changes in Physical Properties of the Separator According to the Compression Temperature —PAN/PVdF (5/5) 11 wt %—DMAc Solution In order to manufacture a separator made of heat-resistant nano-fibers by an air-electrospinning (AES) method, polyacrylonitrile (PAN) of 5.5 g and polyvinylidene fluoride (PVdF) of 5.5 g were added to dimethylacetamide (DMAc) of 89 g, and stirred at 80° C., to thus have prepared a spinning solution made of a heat-resistant polymer and a swelling polymer.

The spinning solution consists of different phases from each other with respect to the heat-resistant polymer and the swelling polymer. Accordingly, phase separation can occur rapidly. The spinning solution was put into a mixing tank stirred using a pneumatic motor to then discharge me polymer solution by 17.5 ul/min/hole. Here, temperature of the spinning section was maintained at 33° C. and humidity thereof was maintained to 60%, while applying a voltage of 100 KV to a nozzle of a spin nozzle pack using a high voltage generator and at the same time an air pressure of 0.25 MPa to a nozzle of the spin nozzle pack, to thus have manufactured an ultrafine fiber web with a mixture of PAN and PVdF.

In order to increase strength of the thus-prepared ultrafine fiber web, the ultrafine fiber web was made to pass through a primary pre-air dry zone in which air of 30° C. were circulating at a speed of 30 m/sec, in a running time (RT) of 3 min/m, to thereby have adjusted the solvent and moisture remaining on the surface of the ultrafine fiber web.

In order to estimate changes in physical properties of the separator according to the compression temperature, the thus-adjusted ultrafine fiber web was moved to a calendering device, to thus have performed a calendering process by using heating/pressurizing rolls with the pressure condition of 20 kgf/cm² while having varied the compression temperature into the room temperature, 70° C., 90° C., 110° C., 130° C., 150° C., 170° C., 190° C., 210° C. and 230° C. Then, in order to remove the solvent and moisture that may remain, the ultrafine fiber web was made to pass through a secondary hot-air dryer at a temperature of 100° C. and with a wind speed of 20 m/sec, to thus have obtained a separator. Various physical properties such as the tensile strength, elastic modulus, bond strength, weight, thickness, average porosity, and air permeability of the thus-obtained separator were measured and shown in Table 2.

TABLE 2

| | Swelling/Heat-resistant polymer 50/50% (PVdF/PAN) | | | | | | | | | |
|---|---|---|---|---|---|---|---|---|---|---|
| Compression temperature (° C.) | Room temp. | 70° C. | 90° C. | 110° C. | 130° C. | 150° C. | 170° C. | 190° C. | 210° C. | 230° C. |
| Tensile strength (Mpa) | 4.50 | 7.50 | 8.20 | 12.60 | 17.90 | 23.60 | 23.90 | 21.40 | 26.90 | 27.20 |
| Tensile expansion rate (%) | 12.10 | 4.10 | 21.10 | 21.20 | 17.70 | 16.80 | 9.40 | 6.00 | 12.00 | 6.20 |
| Elastic modulus (Mpa) | 160.40 | 232.80 | 250.00 | 259.10 | 544.60 | 791.00 | 900.50 | 956.30 | 937.60 | 1118.70 |
| Bond strength (cN/25 mm) | 9.00 | 18.30 | 13.20 | 42.20 | 67.30 | 426.30 | 651.20 | 648.20 | 621.60 | 527.60 |
| Weight (g/m$^2$) | 6.92 | 8.64 | 7.68 | 11.44 | 14.44 | 16.76 | 16.64 | 16.44 | 18.56 | 18.60 |
| Thickness (um) | 23.00 | 24.00 | 28.00 | 28.00 | 25.20 | 27.00 | 23.60 | 24.80 | 26.00 | 25.00 |
| Average pore (um) | 0.42 | 0.39 | 0.43 | 0.27 | 0.21 | 0.26 | 0.23 | 0.22 | 0.22 | 0.27 |
| Air permeability (cfm) | 1.94 | 0.95 | 1.06 | 0.59 | 0.37 | 0.26 | 0.20 | 0.19 | 0.14 | 0.13 |

Referring to Table 2, the separator having performed the calendering process between the calendering temperatures of 170° C. to 210° C. showed all the appropriate values of the tensile strength, elastic modulus and bond strength, but the separator having performed the calendering process beyond the temperature range did not show all the appropriate values of the tensile strength, elastic modulus and bond strength at the same time.

It has been judged that these results were due to phenomena that if the calendering temperature is too low under 170° C., the web is too bulky to have stiffness, and if the calendering temperature is too high in excess of 210° C., the web is melted to thus clog the pores.

The ultrafine fiber web should undergo thermal compression at a temperature that the solvent can be completely evaporated. In general, in order to achieve a stable shrinkage at 150° C. being the heat-resistant temperature required in the secondary battery, thermal compression is preferably executed at 150° C. or higher to thus ensure stability of the separator. Stabilization of the separator is maintained at the time of an actual use by executing a primary pre-shrinkage.

The heat-resistant ultrafine fibrous separator according to the present invention has a small heat-shrinkable characteristic, a heat-resistance performance, and high-strength, and forms the ultrafine fiber layer by the air-electrospinning method while removing the solvent and forming the pores. Accordingly, the heat-resistant ultrafine fibrous separator according to the present invention can be manufactured by a very simple and easy process when compared to the prior art manufacturing process.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit, of the present invention.

Industrial Applicability

The present invention can be applied to a heat-resistant and high-strength separator for use in secondary batteries such as lithium-ion secondary batteries, lithium-ion polymer batteries, and super-capacitors, which require high heat-resistance and thermal stability as in hybrid electric vehicles, electric vehicles and fuel cell vehicles, and its manufacturing method.

The invention claimed is:

1. A heat-resistant and high-strength ultrafine fibrous porous separator manufacturing method: comprising the steps of:
    air-electrospinning a mixed solution of a heat-resistant polymer material and a swelling polymer material, to thereby form a porous web made of a heat-resistant ultrafine fiber in which the heat-resistant polymer material and the swelling polymer material are consolidated in an ultrafine fibrous form;
    performing drying to control a solvent and moisture that remain on the surface of the porous web, to thereby control the strength and porosity of the separator; and
    performing thermal compression of the dried porous web so as to obtain the separator,
    wherein the air-electrospinning is performed by stirring the heat-resistant polymer material and the swelling polymer material in a mixing tank to prevent a phase separation, until the heat-resistant polymer material and the swelling polymer material are mixed with a solvent to then be spun.

2. The porous separator manufacturing method of claim 1, wherein the mixed solution comprises 50-70 wt % of the heat-resistant polymer and 30-50 wt % of the swelling polymer material.

3. The porous separator manufacturing method of claim 1, wherein an air pressure applied to a nozzle of a spin nozzle pack during the air-electrospinning is set in the range of 0.1 to 0.6 Mpa.

4. The porous separator manufacturing method of claim 1, wherein the air-electrospinning is performed by an independent air spray that takes place for respective spinning nozzles using a multi-hole spin nozzle pack.

5. The porous separator manufacturing method of claim 1, wherein the thermal compression temperature is set at a temperature between 170° C. and 210° C.

6. The porous separator manufacturing method of claim 1, wherein the heat-resistant polymer material is a heat-resistant polymer resin that is any one selected from the group consisting of: aromatic polyester containing at least one of polyacrylonitrile (PAN), polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes containing at least one of polytetrafluoroethylene, polydiphenoxy phosphazene, poly {bis [2-(2-methoxyethoxy) phosphazene]}; polyurethane copolymer containing at least one of polyurethane and polyether urethane; cellulose acetate, cellulose acetate butylrate, cellulose acetate propionate, polyester sulfone (PES), and polyether imide (PEI) and any one combination thereof.

7. The porous separator manufacturing method of claim 1, wherein the swelling polymer material is a swelling polymer resin that is any one selected from the group consisting of: polyvinylidene fluoride (PVDF), poly (vinylidene fluoride-co-hexafluoropropylene), perfluoropolymer, polyvinyl chloride or polyvinylidene chloride, and copolymer thereof; polyethylene glycol derivatives containing at least one of polyethylene glycol dialkylether and polyethylene glycol dialkyl ester; polyoxide containing at least one of poly (oxymethylene-oligo-oxyethylene), polyethylene oxide and polypropylene oxide; polyacrylonitrile copolymer containing at least one of polyvinyl acetate, poly (vinyl pyrrolidone-vinyl acetate), polystyrene, polystyrene acrylonitrile copolymer, and polyacrylonitrile methyl methacrylate copolymer; and polymethyl methacrylate and polymethyl methacrylate copolymer, and any one combination thereof.

8. The porous separator manufacturing method of claim 1, wherein the mixed solution further comprises a two-component-system mixed solvent where a high boiling point solvent and a low boiling point solvent are mixed at a weight ratio ranging from 7:3 to 9:1.

9. A heat-resistant and high-strength ultrafine fibrous porous separator manufacturing method: comprising the steps of:
air-electrospinning a mixed solution of a heat-resistant polymer material and a swelling polymer material, to thereby form a porous web made of a heat-resistant ultrafine fiber in which the heat-resistant polymer material and the swelling polymer material are consolidated in an ultrafine fibrous form;
performing drying to control a solvent and moisture that remain on the surface of the porous web, to thereby control the strength and porosity of the separator; and
performing thermal compression of the dried porous web so as to obtain the separator,
wherein an air pressure applied to a nozzle of a spin nozzle pack during the air-electrospinning is set in the range of 0.1 to 0.6 Mpa.

10. The porous separator manufacturing method of claim 9, wherein the mixed solution comprises 50-70 wt % of the heat-resistant polymer and 30-50 wt % of the swelling polymer material.

11. The porous separator manufacturing method of claim 9, wherein the air-electrospinning is performed by an independent air spray that takes place for respective spinning nozzles using a multi-hole spin nozzle pack.

12. The porous separator manufacturing method of claim 9, wherein the thermal compression temperature is set at a temperature between 170° C. and 210° C.

13. The porous separator manufacturing method of claim 9, wherein the mixed solution further comprises a two-component-system mixed solvent where a high boiling point solvent and a low boiling point solvent are mixed at a weight ratio ranging from 7:3 to 9:1.

14. A heat-resistant and high-strength ultrafine fibrous porous separator manufacturing method: comprising the steps of:
air-electrospinning a mixed solution of a heat-resistant polymer material and a swelling polymer material, to thereby form a porous web made of a heat-resistant ultrafine fiber in which the heat-resistant polymer material and the swelling polymer material are consolidated in an ultrafine fibrous form;
performing drying to control a solvent and moisture that remain on the surface of the porous web, to thereby control the strength and porosity of the separator; and
performing thermal compression of the dried porous web so as to obtain the separator,
wherein the air-electrospinning is performed by an independent air spray that takes place for respective spinning nozzles using a multi-hole spin nozzle pack.

15. The porous separator manufacturing method of claim 14, wherein the mixed solution comprises 5070 wt % of the heat-resistant polymer and 30-50 wt % of the swelling polymer material.

16. The porous separator manufacturing method of claim 14, wherein the thermal compression temperature is set at a temperature between 170° C. and 210° C.

17. The porous separator manufacturing method of claim 14, wherein the mixed solution further comprises a two-component-system mixed solvent where a high boiling point solvent and a low boiling point solvent are mixed at a weight ratio ranging from 7:3 to 9:1.

* * * * *